Patented May 3, 1938

2,116,072

UNITED STATES PATENT OFFICE 2,116,072

COMPOSITION OF MATTER AND METHOD OF MAKING THE SAME

Walter J. Koenig, Philadelphia, Pa., assignor to Sloane-Blabon Corporation, Philadelphia, Pa., a corporation of Delaware No Drawing. Application December 22, 1934, Serial No. 758,862

13 Claims. (Cl. 260—2)

This invention relates to a novel composition of matter and particularly to a composition adapted for coatings, plastics and the like, and especially for enamels such as are used in printing of floor covering materials, etc., in which a constituent of the vehicle is adapted to form a resin by condensation with the oil at moderately elevated temperature. The invention further relates to a new method of drying oil by condensation and to resinous products obtained by such condensation drying.

This application is a continuation in part of my prior co-pending application Serial No. 646,148 filed December 7, 1932, entitled Composition of matter and method of making the same now Patent No. 2,058,596. In said prior application, I have disclosed the methods of drying oils by a resin-forming condensation and a number of compositions suitable for drying by such method. With the same objects in view as set forth in my said prior application, I have now discovered that as a class the unsaturated terpenes in which the unsaturated C-atoms are an unsubstituted part of the ring or chain and especially the unsaturated mono-cyclic terpenes are especially valuable in compositions which are to be dried by condensation with the oil.

I have found, furthermore, that the presence of a small amount of a reactive resin, advantageously incorporated as a varnish or ground into the oil like a pigment improves greatly the properties of the resulting composition. In general, however, I have found that synthetic condensation resins, such as various phenolic condensation resins and paracoumarone resins, give desirable results. Inert and acid resins, such as rosin, kauri, etc., apparently do not impart beneficial results.

Careful analytical work on various of these unsaturated terpenes indicates that the condensation occurs by splitting of a double bond of the unsaturated terpenes and a splitting of a double bond of the oil molecule with a recombining of these two molecules to form a ring in which both molecules take part. The terpenes themselves being ring compounds, this results in the formation of a double ring complex molecule, which is probably responsible at least in part for the desirable qualities which are inherent in the products of this reaction. As set forth in my copending application Serial No. 758,864 filed of even date herewith, the more complex the molecule formed by the condensation of the oil, and especially where the condensation of the oil forms a new ring structure, the better will be the properties of the resulting product. To the extent that this double ring formation takes place the invention described and claimed in this present application is within the broad scope of my said co-pending application Serial No. 758,864 as well as within the broader scope of my prior application Serial No. 646,148, referred to above.

The following is a preferred example of my invention which may be given as exemplary of the compounding and treatment of the compositions embodying my invention:

940 pounds China-wood oil
116 pounds dipentene
235 pounds of a reactive resin varnish made with the following composition:
470 pounds raw China-wood oil
160 pounds phenol formaldehyde condensation varnish resin, (e. g., the resin commonly sold as No. 525 Durez)
380 pounds solvent (e. g., a high boiling petroleum thinner known to the trade as "Safety Solvent")

The oils and resins of the varnish are charged into a varnish kettle and heated to 450° F. during 35 minutes. This temperature is held for 25 minutes longer, after which the varnish is cooled and thinned with solvent.

The rest of the China-wood oil is placed in a Bedford kettle and blown at 180° to 190° F. until it attains a viscosity of about 7" Gardner-Holdt. The air is then shut off and the reactive resin varnish and the dipentene are added and additional thinner, if desired. Heating is continued until the temperature reaches 200° F. and the mixture is held for 8 minutes at that temperature. The air is thereupon shut off and the mixture cooled to room temperature.

The final product obtained, as described above, may be used directly as a varnish. It is, however, especially adapted as a vehicle for enamels, etc., e. g., to be used in the manufacture of floor coverings and like materials. For this purpose the vehicle may be mixed and ground with pigment, etc., substantially as known to the prior art, for example, as set forth in my prior application Serial No. 646,148. However, since the drying of this vehicle is to be effected by a condensation reaction with oxidation minimized so far as practicable, it will be understood that the use of the driers as has been common in the prior art is preferably to be avoided. Small amounts of the driers can be tolerated without serious disadvantage and may even in some cases be desirable, e. g., where extreme hardness is to be obtained at some sacrifice in toughness and permanent pliability.

These compositions, either the vehicle as a varnish or the paint, as just described, may be applied even in very thick films and dried to form a tough permanently flexible coating which is highly resistant to the action of alkalies and to abrasives.

The condensation reaction by which drying is effected does not seem to take place at ordinary atmospheric temperatures but requires a moderately elevated temperature, e. g., as high as 115° F., before it will proceed at an economical speed. I have found that temperatures between 130° F. and 145° F. are most advantageous for this purpose. Much higher temperatures may be used, but if too high, the terpene may be evaporated before it is reacted with the oil. However, in case higher temperatures are used, excess terpene can be added to compensate for evaporation. If the curing is effected in an atmosphere which consists predominantly of the solvent and/or terpene so that little or no oxygen is present at the interface between the oil and the atmosphere, a smooth glossy film will result. If a dull matte finish is desired, this can be obtained by permitting more oxygen to reach the surface during the curing period. Thus, for example, if the curing is effected in ordinary linoleum or print goods heaters, the fresh air inlet should be used only if a matte surface is desired. Otherwise, if a glossy finish is intended, the fresh air inlet should be closed and the vapors of the solvent and the terpene should be confined within the heater.

These paints dry very rapidly at elevated temperatures in substantially inert atmospheres, and excellent results are obtained in dry air or highly humid atmospheres. If a gloss is desired, drying should be in an inert atmosphere or preferably in an atmosphere consisting largely of the vapor of the vehicle. If drying is in open air, not confined so as to collect the vapors of the vehicle, the coating may be dried with a beautiful soft matte finish. Any degree of gloss may be attained by confining the drying atmosphere more or less. To the extent that this oxidation is relied upon to produce the gloss or other surface characteristics, the process will be within the scope of my copending application Serial No. 7,717 Series 1935 filed herewith.

In this example, I have set forth in detail the preferred ingredients and proportions. It is understood, however, that these can be varied within relatively wide limits without departing from the scope of my invention. For example, it will be readily understood that the proportions of thinner will depend primarily upon the consistency desired, and these may be varied, as will be apparent to anyone skilled in the art. The particular thinner chosen for this purpose also is a matter of free choice. The thinner preferably should be one which is inert or one which condenses with the oil or the oil condensation product as in this case does the dipentene. In general, mineral thinners are to be preferred.

Similarly, other resins and varying proportions of resins may be used in place of those specified. For the reactive resins, other phenolic condensation resins or paracoumarone resins may be substituted or other reactive resins which have a tendency to further condensation.

Instead of dipentene used in the above example, the various other unsaturated terpenes which are unsubstituted in the unsaturated position, and especially the unsaturated mono-cyclic terpenes may be used and may be substituted pound for pound on the formula given. Many of these are, of course, at the present time far too expensive as articles of commerce or as laboratory chemicals to be used commercially for this purpose. So far as I have been able to try them, however, all compounds of this class are capable of condensation with the drying oil to produce valuable resinous products. Among these may be especially mentioned d- and l- limonenes and inactive limonene, terpinolene, terpinene, sylvestrene, phellandrene, menthene, δ-fenchene, carvomenthene; but this list is not to be taken as excluding others.

The proportions of the terpene or terpenes used in any particular embodiment of my invention are not, of course, limited to those specified in the above examples. It has been demonstrated by careful analysis that a definite amount of the terpenes enter into reaction with the oil. Ordinarily it will be necessary to have some excess present in order to take care of the volatilization which necessarily takes place during the initial stages of the curing.

I have also effected condensation drying of oil films by placing them in an atmosphere of the vapors of the terpenes. In this case, the vapors are absorbed to some extent into the film where they will react with the oil. Ordinarily it will be more convenient to incorporate the terpene with the oil as described above, but this tendency to absorb the terpene vapors from the atmosphere should be kept in mind, especially where several different compositions are to be cured in the same heater.

Other oils, in which I include treated and untreated drying oils, treated semi-drying oils and non-drying oils, that possess double bonds in conjugate arrangement, e. g., —C=C—C=C— or —C=C—C=C—C=C—, (such as China-wood oil, fish oils, oiticica oil, blown or properly oxidized linseed oil, blown or properly oxidized soya bean oil, blown or properly oxidized poppyseed oil, etc., castor oil heated under reduced pressures to form conjugate double bond structure and esterified, blown or properly oxidized drying oil fatty acids, and the above treated and untreated oils, having the above double bond conjugate structure, blown with drying oil fatty acids or such oils to which blown or properly oxidized fatty acids have been added) fall within the scope of my invention.

I prefer to use blown or properly oxidized oils, although the raw oils having the above described conjugate double bond arrangement will dry in accordance with my invention.

The terpenes apparently are capable of condensing with the oils at any unstable double bond, but apparently this occurs most readily and with the formation of the most advantageous structure in the condensed molecules when the condensation occurs at a conjugate double bond structure such as is present in elaeostearic acid of China-wood oil. Thus I have found that products made according to my invention from Chinawood oil dry faster and give better final products from the standpoint of wear and alkali resistance than the structure having the interposed methylene groupings and ethylenic linkages as, for example, in linolic and linolinic acids and glycerides.

Excessive temperatures are likely to cause a noticeable discoloration in the curing. If the film of the paint is thick, e. g., 0.6 pound per square yard, during the curing, too high a temperature may result in an irregular surface, e. g., an orange peel, or even wrinkling. The ideal temperature will vary for different kinds of applications.

A small amount of oxygen seems to stimulate the condensation reaction. Thus, as little as 0.2 percent oxygen in 99.8 percent nitrogen produces rapid drying at super-atmospheric temperatures, and an excellent type of film. However, the oil film, including condensing agents mentioned above and blown China-wood oil in the presence of a small amount of active resin, will dry in pure nitrogen to form an excellent film, but the curing temperature should be 200° F. or above.

A paint is given above as one example of the invention because the invention is of great practical importance in the field of print paints for floor coverings, etc. Clear varnishes, however, may be used which may be similar to the paint, but without the pigment; and other types of composition, both fluid and plastic, may be similarly made. These compositions, whether liquid or solidified, may also be dispersed in water emulsions. Printing inks, lithograph varnishes, coatings for tin cans, etc., coating, impregnating and insulating varnishes and paints in general, protective coatings for automobiles, machinery, furniture and other articles, and plastics both for manufacturing of linoleum, tiles and similar products, and for molded articles such as household utensils, decorative objects, implements, handles and numerous other articles now made of molded plastics, all may be made with compositions of my invention.

Where a gelled vehicle is desired, the mineral or inert thinner may be partially or entirely omitted and the heat treatment continued until the desired viscosity is obtained, as will be readily understood by those skilled in the art. In this case also it may be desirable to blow the oil to a somewhat heavier consistency before the terpene ingredient is added.

For best results, I have found that a hot blending treatment, e. g., as specified in the above example, is important. I have also obtained good results when this hot blending includes a blowing step in the Bedford kettle, e. g., throughout the eight (8) minutes heating at 200° F. Such a blowing step may oxidize the terpenes to some extent and convert them into oxy-terpenes and to that extent would bring the method within the scope of my co-pending application, Serial No. 758,861 filed of even date herewith now Patent No. 2,058,598.

Other compounds presenting unsaturated structures similar to the mono-cyclic terpenes, e. g., styrene, may be used like the terpenes and are to be considered as within the scope of this application. Indene, similarly, can be condensed with the oils.

It is of primary importance, moreover, that according to the present invention, the reaction can be initiated en masse and then interrupted at a point short of complete drying. Thus, the more costly final step of heating the finished article can be reduced to a very short treatment.

If more than one condensing agent is used, it is not necessary to add the several condensing agents as a mixture at the start of the reaction. The reaction may be started with a single condensing agent, and after the reaction has progressed to any point before becoming a solid mass, the reaction may be retarded by merely cooling the mixture. Additional condensing agent may then be added, if desired, and the reaction accelerated again by merely raising the temperature. The addition of more than one condensing agent tends to create final products having more complex structures, thereby creating a tougher film in the final product. It is understood that the reaction may be retarded and accelerated any number of times before completion, and, if desired, additional condensing agent may be added which enter the condensation reaction. If desired, an additional quantity of the original condensing agent may be added. It is within the scope of this invention to include the addition of an additional quantity of the same condensing agent used at the start of the reaction and/or a different one at any point in the reaction. The feature of accelerating and retarding the reaction at any desired point in the reaction is a very desirable point, and is accomplished by merely controlling the temperature. It is not necessary to add additional condensing agents to again accelerate the reaction after is has been retarded, although this may be done if so desired, as explained above.

It seems clear that a condensation occurs. The extent of condensation depends on the condensing agents used, but regardless whether the condensation is partial or practically complete, the reaction falls within the scope of this invention, since my invention embraces rapid drying action at super-atmospheric temperatures in substantially non-oxidizing atmospheres, as due to the condensation. In the case of partial condensation, i. e., where the amount of condensing agent is less than in stoichiometric relations, it is my theory that the presence of the particular type of condensation product of the oil and condensing agents is responsible for the rapid drying. The invention described herein cannot be construed in the same light as the action of driers, as the action proceeds unimpeded or rapidly, as the case may be, in substantially non-oxidizing atmospheres at super-atmospheric temperatures with definite favorable results starting as low as 120° F., which, in addition, differentiates from polymerization and oxidation under similar conditions.

In the above specification, I have given examples and suggested certain modifications for the purpose of illustrating the invention without in any way attempting to exhaustively cover all of the various modifications and applications of my invention. Similarly, I have expressed certain theories which I have developed in the course of my investigations and practical experience with this invention, which, I believe, may be helpful to those who subsequently apply and extend the application of my invention. However, I have not as yet tested these theories sufficiently to set them up as certainly correct, and since the invention is in no way dependent upon the correctness of any theories which I have expressed, it is to be understood that the scope of my invention and of this application is not to be limited thereby.

I have used the term "condensation" herein broadly to mean the union of two or more organic substances with or without the elimination of component elements.

What I claim is:

1. The method of hardening drying oil which comprises condensing a mixture in which the condensation reactants consist of oxidized drying oil having double bonds in conjugate arrangement and an unsaturated hydrocarbon terpene at superatmospheric temperature.

2. The method of hardening drying oil which comprises condensing a mixture in which the condensation reactants consist of oxidized drying oil having double bonds in conjugate arrangement and an unsaturated mono-cylic hydrocarbon terpene at super-atmospheric temperature.

3. The method of hardening drying oil which comprises condensing a mixture at super-atmospheric temperature in which the condensation reactants consist of oxidized drying oil having double bonds in conjugate arrangement and a mono-cyclic hydrocarbon terpene having unsaturation in a side chain.

4. The method of hardening drying oil as defined in claim 2, in which the hydrocarbon terpene is dipentene.

5. The method of hardening drying oil as defined in claim 2, in which the hydrocarbon terpene is terpinene.

6. The method of hardening drying oil as defined in claim 2, in which the hydrocarbon terpene is sylvestrene.

7. The method of hardening drying oil as defined in claim 2, in which the atmosphere at the surface of the oil is maintained with an oxygen content essentially less than that of atmospheric air until the oil is substantially hardened.

8. The method of hardening drying oil as defined in claim 2, in which a synthetic resin is present during the condensation reaction.

9. The method of hardening drying oil which comprises condensing a mixture in which the condensation reactants consist of oxidized drying oil having double bonds in conjugate arrangement and an unsaturated hydrocarbon terpene at super-atmospheric temperature, and maintaining an atmosphere consisting primarily of vapors of said terpene over the surface of said oil while it is hardening by condensation with the terpene.

10. The method of hardening drying oil which comprises condensing a mixture in which the condensation reactants consist of oxidized drying oil having double bonds in conjugate arrangement and an unsaturated hydrocarbon terpene at super-atmospheric temperature, cooling the mixture, forming it to the shape which it is intended to maintain when hardened, then heating the shaped product to a super-atmospheric temperature thereby hardening it through a further condensation reaction.

11. The method of hardening drying oil which comprises condensing a mixture, in which the condensation reactants consist of oxidized drying oil having double bonds in conjugate arrangement and an unsaturated hydrocarbon terpene, at super-atmospheric temperature until a desired viscosity is attained, cooling the mixture, shaping the condensed mixture to the shape which it is intended to maintain when hardened, finally hardening the shaped mass at super-atmospheric temperature.

12. The method as defined in claim 11, in which the hardening of the shaped product is done in an atmosphere substantially devoid of oxygen.

13. A composition of matter adapted for use in paints, varnishes, enamels, plastics and the like, which comprises a condensed mixture in which the condensation reactants consist of oxidized drying oil having double bonds in conjugate arrangement and an unsaturated hydrocarbon terpene.

WALTER J. KOENIG.